United States Patent [19]
Bond et al.

[11] Patent Number: 5,429,330
[45] Date of Patent: Jul. 4, 1995

[54] DUCT SYSTEM AND METHOD FOR ASSEMBLING SAME

[75] Inventors: Richard J. Bond, Austin, Tex.; Richard C. Bond, Dakota Dunes, S. Dak.

[73] Assignee: Refrigeration Specialists, Inc., Sioux City, Iowa

[21] Appl. No.: 200,422

[22] Filed: Feb. 23, 1994

[51] Int. Cl.⁶ ............................................. F16L 3/02
[52] U.S. Cl. ................................. 248/61; 248/74.2; 248/230; 248/316.5
[58] Field of Search .................. 248/49, 58, 63, 59, 248/61, 62, 65, 74.2, 230, 231.6, 316.1, 316.5; 138/106, 107, 118, 119, 128, 156, 170, 171, 172; 52/22, 27, 506.02, 698

[56] References Cited

U.S. PATENT DOCUMENTS

| 1,924,353 | 8/1933 | Fitzpatrick | 248/62 |
| 2,099,756 | 11/1937 | Seigle | 138/106 |
| 2,787,435 | 4/1957 | Shields | 248/340 |
| 2,942,819 | 6/1960 | Brogan | 248/58 |
| 3,033,978 | 5/1962 | Dusen | 248/61 |
| 3,370,815 | 2/1968 | Opperthauser | 138/106 |
| 5,230,302 | 7/1993 | Steudkr | 248/58 |

OTHER PUBLICATIONS

P. 88 of Modern Hanger Corp. Catalog, 1953.

*Primary Examiner*—Leslie A. Braun
*Assistant Examiner*—Gwendolyn Wrenn
*Attorney, Agent, or Firm*—Zarley, McKee, Thomte, Voorhees, & Sease

[57] ABSTRACT

A track assembly for suspending an elongated duct from a supporting structure includes a rail assembly formed from a plurality of cylindrical tube segments and a plurality of splicer members interconnecting the tube segments in end to end relationship. The plurality of elongated hanger members are detachablely connected to the rail assembly and are adapted to be connected to a supporting structure. A plurality of slide members are mounted on the rail assembly for sliding movement along the length thereof past the splicer members and the hanger members. Each of the slide members has a clip attached thereto capable of detachable securement to an elongated duct.

11 Claims, 2 Drawing Sheets

DUCT SYSTEM AND METHOD FOR ASSEMBLING SAME

BACKGROUND OF THE INVENTION

The present invention relates to a duct system and method for assembling same.

In certain air-handling systems such as those found in food processing facilities, there is a need for duct air-handling systems which are made from fabric and which may be suspended from ceilings or overhead structures. These fabric duct systems carry air-conditioning for the facilities. However, because of sanitation requirements, it is necessary to be able to disassemble or fold up these duct handling system for cleaning the facilities in which they are mounted, and also for cleaning the ducts themselves.

Therefore a primary object of the present invention is the provision of an improved duct system and method of assembling same.

A further object of the present invention is the provision of an improved duct system which can be suspended on a rail and which can be easily folded or removed from the rail for cleaning.

A further object of the present invention is the provision of an improved duct system which minimizes areas where dirt and bacteria can collect so as to maximize the sanitation of the system.

A further object of the present invention is the provision of an improved duct system and method for assembling same which is economical to manufacture, durable in use, and efficient in operation.

SUMMARY OF THE INVENTION

The foregoing objects may be achieved by a track assembly for suspending an elongated flexible duct from a supporting structure. The track assembly includes a rail assembly formed from a plurality of cylindrical tube segments and a plurality of splicer members interconnecting the tube segments in end to end relationship. A plurality of elongated hanger members each have a lower end detachably connected to the rail assembly and an upper end adapted to be connected to a supporting structure. A plurality of slide members are mounted on the rail assembly for sliding movement along the length thereof past the splicer members and the hanger members. Each of the slide members includes a clip attached thereto, the clip being capable of detachable securement to an elongated duct. The foregoing system permits the duct to be suspended from a supporting structure and to be moved along the rail assembly to the desired position. The foregoing system also permits the ducts to be removed easily from the rail assemblies merely by sliding the slide members to, or off of, the end of the rail assemblies.

DETAILED DESCRIPTION OF THE PREFERRED EMBODIMENT

Figure 1:
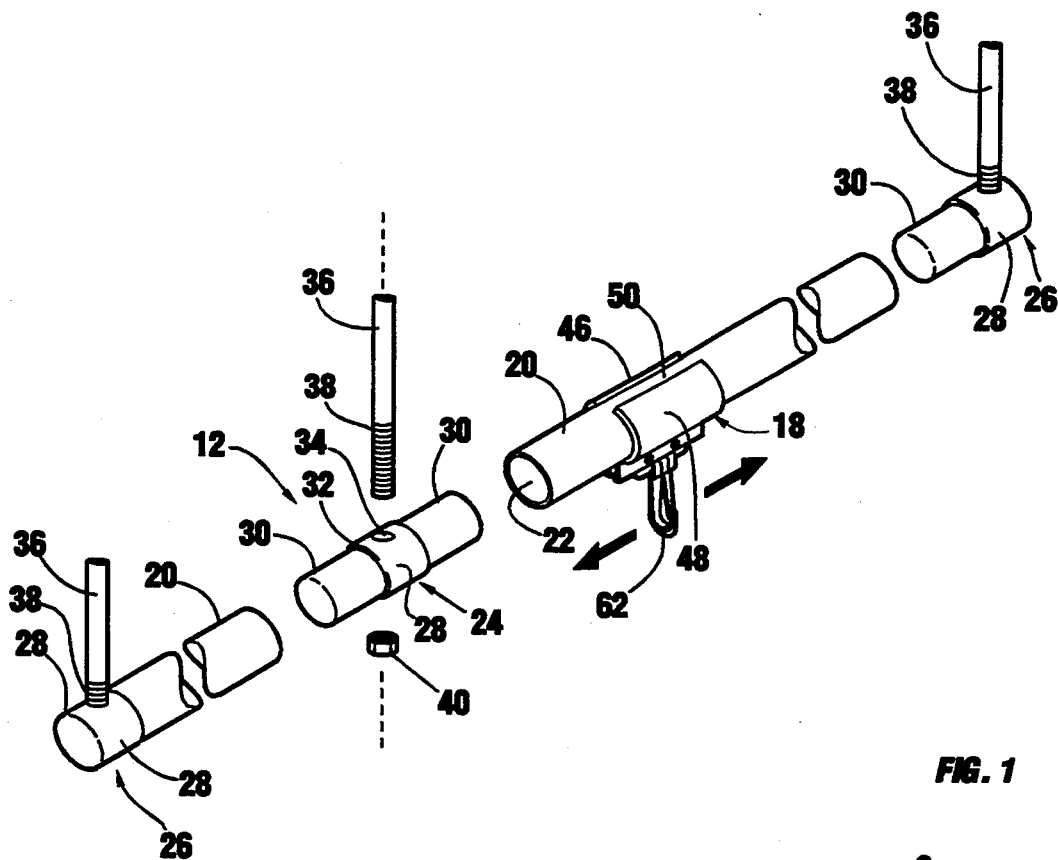
FIG. 1 is a perspective exploded view of the rail assembly to which the duct is mounted.

Referring to the drawings the numeral 10 generally designates a duct system of the present invention. Duct system 10 includes a rail assembly 12 from which is suspended a fabric duct 14. The system is suspended from a supporting structure 16. Mounted over the rail are a plurality of slide blocks 18 which slide along the rail assembly 12 and which include clips 62 attached to the duct 14.

Figure 3:
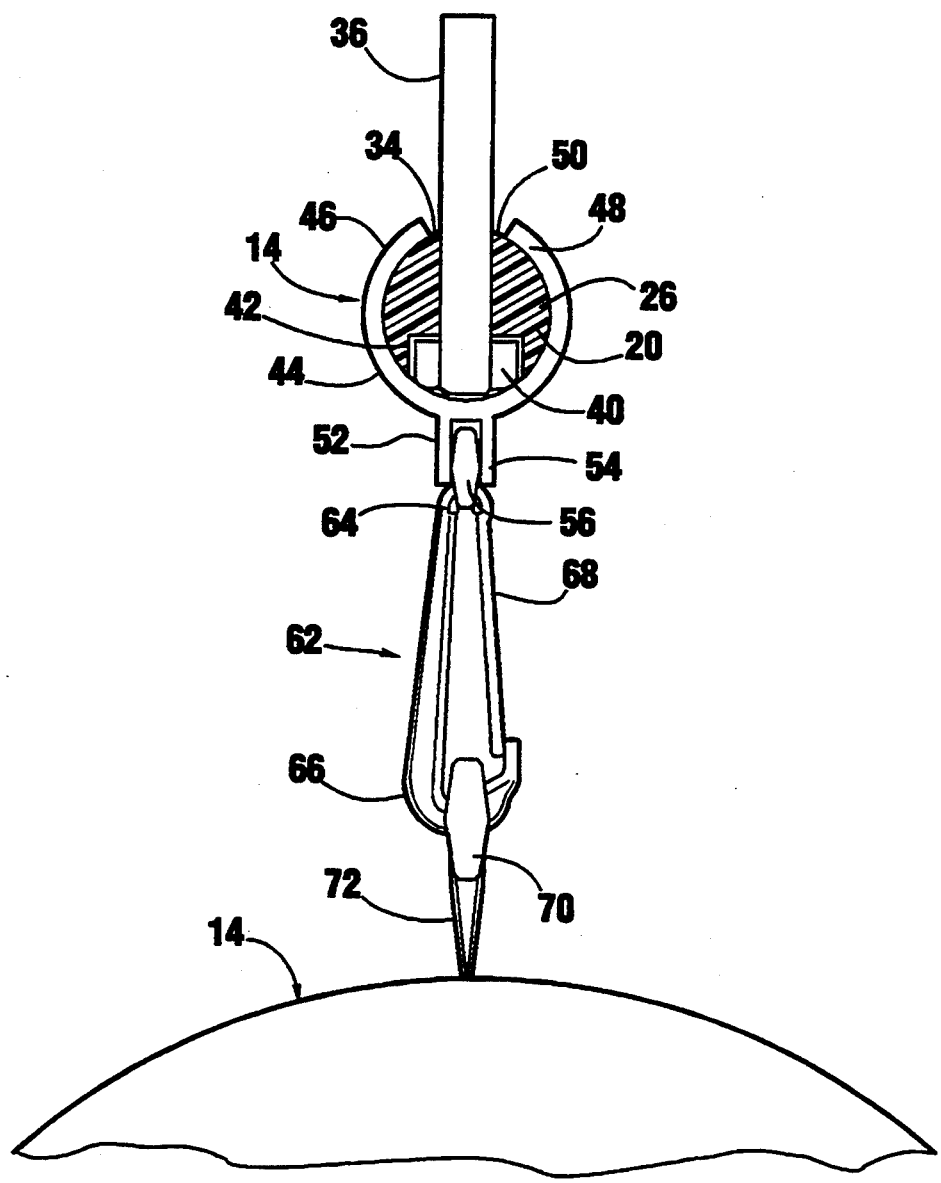
FIG. 3 is an end elevational view taken along line 3—3 of FIG. 2.

Rail assembly 12 includes a plurality of tube segments 20 each of which has a hollow bore 22 extending therethrough. The tube segments 20 are interconnected by a plurality of splice members 24 and the ends of the rail assembly are provided with end members 26. The splice members 24 each are comprised of an enlarged diameter portion 28 centered between two reduced diameter portions 30 at the opposite ends thereof. Two spaced apart annular shoulders 32 separate the ends of the enlarged diameter portion 28 from the reduced diameter ends 30. The end members 26 are of the same construction as the splice members 24 with the exception that the end members 26 include only one reduced diameter end 30. The enlarged diameter portions 28 of splice members 24 and end members 26 each include a diametric bore 34 extending therethrough. A hanger 36 extends into the diametric bore 34 and includes threads 38 on its lower end for receiving a nut 40. Nut 40 is fitted within a counterbore 42 (FIG. 3) so that the nut does not protrude radially outwardly beyond the outer cylindrical surface of the enlarged diameter portion 28.

Figure 2:
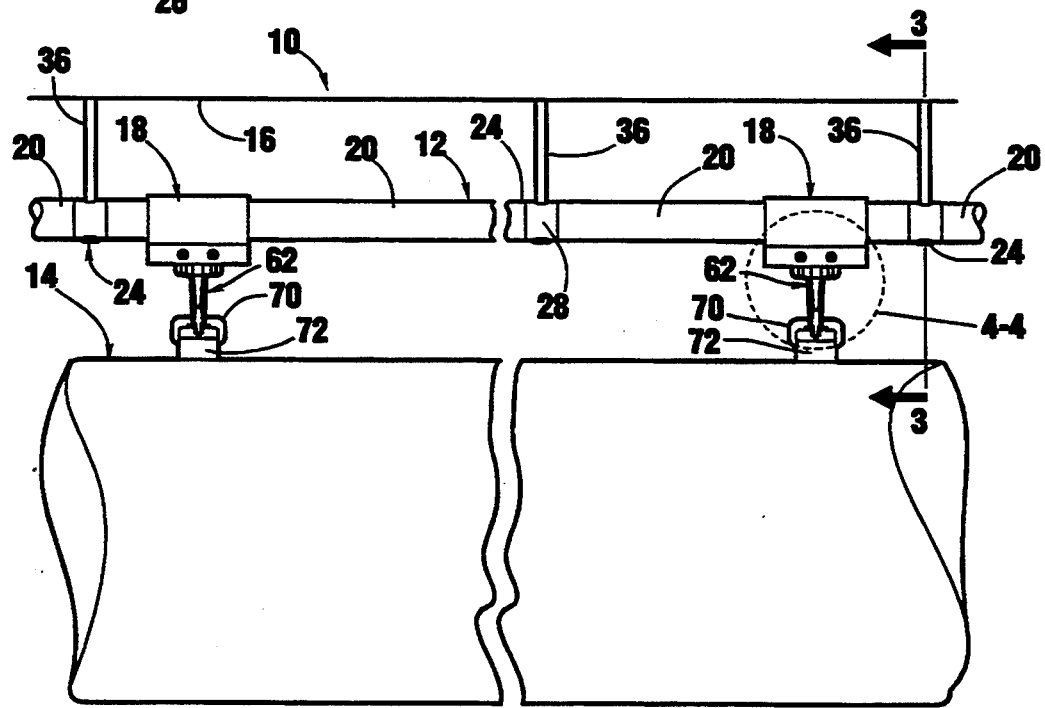
FIG. 2 is an elevational view, partially broken away, of a rail assembly having a duct suspended therefrom.

The rail assembly is assembled by inserting the reduced diameter portions 30 into the hollow bores 22 at the ends of tube segments 20. The tube segments 20 are then fitted tightly against the axially presented shoulders 32 of the splice members 24. As can be seen in FIG. 2, the resulting rail assembly 12 has a smooth continuous outer surface formed by the outer cylindrical surfaces of the tube segments 20 and by the enlarged diameter portions 28 of the splice members 24.

The upper ends of hangers 36 are adapted by threads or other means not shown to be connected to a supporting structure such as a ceiling or beam. This permits the rail assembly 12 to be suspended from the supporting structure 16.

Figure 4:
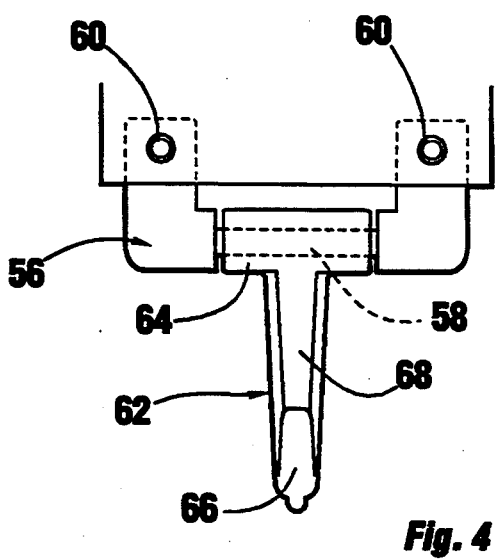
FIG. 4 is an enlarged detail view taken at line 4—4 of FIG. 2.

Slide blocks 18 each include a partial sleeve 44 which is C-shaped in cross section and which includes a pair of spaced apart C-legs 46, 48 which extend around and are slideably fitted over the rail assembly 12. The ends of C-legs 46, 48 are spaced apart so as to provide a gap 50 which is sufficiently wide to clear the hangers 36 as the slide blocks 18 slide along the length of the rail assembly 12. Extending downwardly from the sleeve 44 are a pair of spaced apart legs 52, 54. A U-shaped hinge bracket 56 (FIGS. 3 and 4) is fitted between the two spaced apart legs 52, 54 and is secured therebetween by rivets 60. Hinge bracket 56 includes a horizontal hinge pin 58 over which is mounted a partial sleeve 64 of the clip 62.

Clip 62 includes a hook portion 66 and a spring arm 68 which is adapted to spring apart so as to permit a grommet 70 to be hooked over the hook portion 66. Grommet 70 is shown to be connected to a fabric loop 72 on the flexible duct 14.

The present invention can be easily mounted in any desired facility. The rail assembly is assembled as described above and is suspended from the supporting surface 16 by the hangers 36. Next the grommets 70 on duct assembly 14 are hooked to the various clips 62 of the slide blocks 18. The slide blocks 18 can then be slid over the ends of the rail assembly until the entire duct 14 is supported beneath the rail assembly.

One important feature of the present invention is the ability to remove the duct for periodic cleaning. The ability to quickly remove the duct for cleaning is important, particularly in food processing areas so as to insure proper sanitation. Also it is easy to remove the duct so that other equipment in the facility can be accessed and cleaned.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A track assembly for suspending an elongated duct from a supporting structure, said track assembly comprising:
    a rail assembly comprising a plurality of cylindrical tube segments and a plurality of splicer members interconnecting said tube segments in end to end relationship;
    a plurality of elongated hanger members each having a lower end detachably connected to said rail assembly and an upper end adapted to be connected to said supporting structure;
    a plurality of slide members mounted on said rail assembly for sliding movement along the length thereof past said splicer members and said hanger members;
    each of said slide members having a clip member attached thereto, said clip members each being capable of detachable securement to said elongated duct.

2. A track assembly according to claim 1 wherein said tube segments and said splicer members combine to form a single substantially smooth cylindrical surface along the length of said rail assembly.

3. A track assembly according to claim 2 wherein said hanger members protrude in a first radial direction from said cylindrical surface, said slide members each including a partial sleeve partially surrounding the circumference of said cylindrical surface and having a pair of spaced apart sleeve arms which are spaced sufficiently far apart to permit said hanger members to fit therebetween during longitudinal sliding movement of said slide members on said rail assembly.

4. A track assembly according to claim 2 wherein each of said tube segments have an outer cylindrical surface, and each of said splicer members comprise a first outer cylindrical surface sized and shaped the same as said outer cylindrical surface of said tube segments.

5. A track assembly according to claim 4 wherein each of said splicer members include reduced diameter portions on opposite sides of said first outer cylindrical surface, said reduced diameter portions being frictionally fitted within two adjacent ones of said tube segments for joining said two adjacent ones of said tube segments together.

6. A track assembly according to claim 5 wherein said hanger members are each detachably secured to one of said splicer members.

7. A track assembly according to claim 6 wherein said splicer members each include a bore extending diametrically therethrough, said hanger members each extending within one of said diametric bores, 8. A track assembly according to claim 7 wherein each of said bores include a counterbore; a nut being fitted within said counterbore and being recessed radially inwardly from said first outer cylindrical surface of said splicer member, said nut threadably engaging said hanger member.

9. A track assembly according to claim 2 wherein said slide members each are C-shaped in cross section and include spaced apart C-arms slidably embracing a portion of said smooth cylindrical surface of said rail assembly, said C-arms having terminal ends forming a gap therebetween, said gap being registered with said hanger members so that said slide members can slide by said hanger members.

10. A combination suspendible from a supporting structure comprising:
    an elongated duct comprised of flexible material;
    a rail assembly comprising a plurality of cylindrical tube segments and a plurality of splicer members interconnecting said tube segments in end to end relationship;
    a plurality of elongated hanger members each having a lower end detachably connected to said rail assembly and an upper end adapted to be connected to said supporting structure;
    a plurality of slide members mounted on said rail assembly for sliding movement along the length thereof past said splicer members and said hanger members;
    each of said slide members having a clip member attached thereto, said clip members each being detachably secured to said elongated duct.

11. A method for suspending an elongated flexible duct from a supporting surface comprising:
    forming an elongated rail assembly from a plurality of tube segments interconnected in end to end relationship with one another by a plurality of splicer members;
    connecting a plurality of hanger members to said rail assembly at a plurality of spaced apart points along the length thereof;
    connecting each of said hanger members to said supporting structure to suspend said rail assembly from said supporting structure;
    attaching a plurality of slide members to said duct at spaced apart locations along the length thereof, each of said slide members having a pair of spaced apart C-arms terminating in C-arm ends which are spaced apart a predetermined gap from one another, said C-arms being sized and shaped to retentively embrace said rail assembly for longitudinal sliding movement thereon;
    placing said C-arms around said rail assembly and sliding said slide members longitudinally thereon whereby said gaps of said C-arms register with said hanger members to permit said slide members to slide by said hanger members.

* * * * *